(12) United States Patent
Ragsdale, Sr.

(10) Patent No.: US 7,748,548 B1
(45) Date of Patent: Jul. 6, 2010

(54) HITCH ASSEMBLY FOR A TRANSPORTER

(76) Inventor: Frank D. Ragsdale, Sr., 12367 Old US Hwy. 52, Winston-Salem, NC (US) 27107

( * ) Notice: Subject to any disclaimer, the term of this patent is extended or adjusted under 35 U.S.C. 154(b) by 570 days.

(21) Appl. No.: 11/737,980

(22) Filed: Apr. 20, 2007

(51) Int. Cl.
*B61G 5/00* (2006.01)
*B60D 1/00* (2006.01)

(52) U.S. Cl. .................. 213/75 R; 213/96; 280/504

(58) Field of Classification Search ............... 213/75 R, 213/77, 78, 96, 98, 152; 280/504, 508, 509
See application file for complete search history.

(56) References Cited

U.S. PATENT DOCUMENTS

| 2,847,233 | A | * | 8/1958 | Minton | 280/504 |
| 4,368,899 | A | * | 1/1983 | Smalley et al. | 280/477 |
| 4,886,391 | A | | 12/1989 | Ragsdale, Sr. | 403/19 |
| 4,982,488 | A | | 1/1991 | Ragsdale, Sr. | 29/263 |

* cited by examiner

*Primary Examiner*—S. Joseph Morano
*Assistant Examiner*—Robert J McCarry, Jr.
(74) *Attorney, Agent, or Firm*—Olive Law Group, PLLC

(57) ABSTRACT

A transporter. The transporter includes: a first unit; at least one second unit; and a coupler attached between the first unit and the second unit, the coupler coaxially aligned with the coupling axis thereby permitting rotational movement perpendicular to the coupling axis and an auto lock mechanism attached to the coupler for permitting hands free coupling of the first unit and the at least second unit. The transporter may further include at least one articulated joint attached between the coupler and one of the first unit and the second unit.

47 Claims, 8 Drawing Sheets

US 7,748,548 B1

HITCH ASSEMBLY FOR A TRANSPORTER

BACKGROUND OF THE INVENTION (1) Field of the Invention

The present invention relates generally to trailer hitches and, more particularly, to a coupler for connecting at least two units having improved ease of attachment and increased safety.

(2) Description of the Prior Art

Trailer hitches have been used for decades to connect a towing vehicle to a towed unit usually a wheeled trailer. Passenger vehicles are often used to tow trailers. This creates a need for a towing hitch which can be affixed to the vehicle, easily connected and that can accommodate the towing forces for which the vehicle and towed unit are subject to when traveling over all types of terrain. Typically, the hitches have consisted of a mounted ball on some support emanating from the vehicle. A socket type unit on the trailer fits over the mounted ball to ensure trailer and vehicle connection.

This conventional style of trailer hitch presents many problems. Connection of the trailer to the towing vehicle has proven difficult and cumbersome. The operator must have precise horizontal and vertical alignment for the socket to fit over the mounted ball. The operator is usually shielded from viewing the trailer socket and mounted ball by blind spots in the towing vehicle, thus the operator is left only to guess if the ball and socket are vertically and horizontally aligned. If the operator is connecting the vehicle to the trailer alone, the operator may be forced to enter and exit the vehicle assembly several times to ensure horizontal and vertical ball and socket assembly. Worse yet, the operator may not have suitable alignment and may contact the exterior of the vehicle with the trailer tongue and cause substantial vehicle or trailer damage.

Once the ball and socket are aligned, the operator must exit the vehicle again and place the socket over the ball. This is usually done with a vertical jack mounted near the tongue of the trailer. Once the socket slides into place over the mounted ball, the operator must then manually engage the locking mechanism on the socket coupler. In addition, the operator may have to insert a safety pin or connect chains or some other type of restraint device. In some cases, the vehicle or trailer position may shift during this time thus frustrating the horizontal and vertical ball and socket alignment necessary for trailer connection.

Thus, there remains a need for a new coupler for connecting at least two units which has improved ease of attachment while, at the same time, provides an auto lock mechanism for permitting hands free coupling of the units.

SUMMARY OF THE INVENTION

The present invention is directed to a transporter including: a first unit; at least one second unit; and a coupler attached between the first unit and the second unit, the coupler coaxially aligned with the coupling axis thereby permitting rotational movement perpendicular to the coupling axis and an auto lock mechanism attached to the coupler for permitting hands free coupling of the first unit and at least one second unit. The transporter may further include at least one articulated joint attached between the coupler and one of the first unit and the second unit.

In the preferred embodiment, the coupler includes an inner shaft connected to one of the units, a sleeve connected to the other unit for receiving the inner shaft and at least one locking shoulder on the inner shaft and at least one mating shoulder in the sleeve. The distal end of the sleeve is flared to allow for guided entry on the inner shaft into the sleeve. The inner shaft includes a locking shoulder, which extends outwardly and the outer sleeve includes a mating shoulder, which extends inwardly. The inner shaft is tapered and the mating shoulder of the sleeve is biased in the closed position.

At least one locking shoulder and mating shoulder are releasable. The mating shoulder extending inwardly includes a cammed release, which is controlled with a mechanical lever. The coupler may also include a second lock mechanism, which may include at least one removable pin engaging the inner shaft and the sleeve, whereby the removable pin may be further secured by the use of a lock pin or related fastener.

The preferred embodiment also includes at least one shear collar flush with a mating surface of said inner shaft. The shear collar is fixed to the inner shaft and covers about 250° of said inner shaft. The overlap between the locking shoulder and the mating shoulder is greater than about 45°. The overlap between the locking shoulder and the mating shoulder is substantially 360°.

Accordingly, one aspect of the present invention is to provide a transporter, the transporter including: (a) a first unit; (b) at least one second unit; and (c) a coupler attached between the first unit and the second unit, the coupler coaxially aligned with the coupling axis thereby permitting rotational movement perpendicular to the coupling axis.

Another aspect of the present invention is to provide in a transporter having a first unit and at least one second unit adapted to be coupled together, an improvement including: (a) a coupler coaxially aligned with the coupling axis thereby permitting rotational movement perpendicular to the coupling axis; and (b) an auto lock mechanism attached to the coupler for permitting hands free coupling of the first unit and at least one second unit.

Still another aspect of the present invention is to provide a transporter, the transporter including: (a) a first unit; (b) at least one second unit; (c) a coupler attached between the first unit and the second unit, the coupler coaxially aligned with the coupling axis thereby permitting rotational movement perpendicular to the coupling axis and an auto lock mechanism attached to the coupler for permitting hands free coupling of the first unit and the at least second unit; and (d) at least one articulated joint attached between the coupler and one of the first unit and the second unit.

These and other aspects of the present invention will become apparent to those skilled in the art after a reading of the following description of the preferred embodiment when considered with the drawings.

DESCRIPTION OF THE PREFERRED EMBODIMENTS

Figure 1:
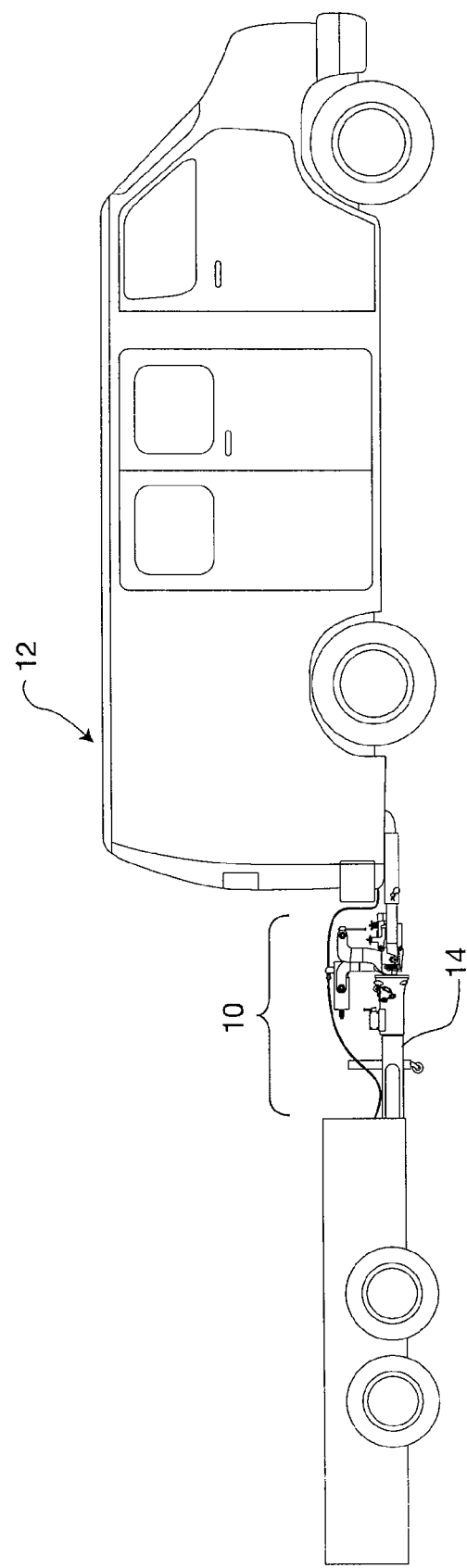
FIG. 1 is a perspective view of a transporter constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 3:
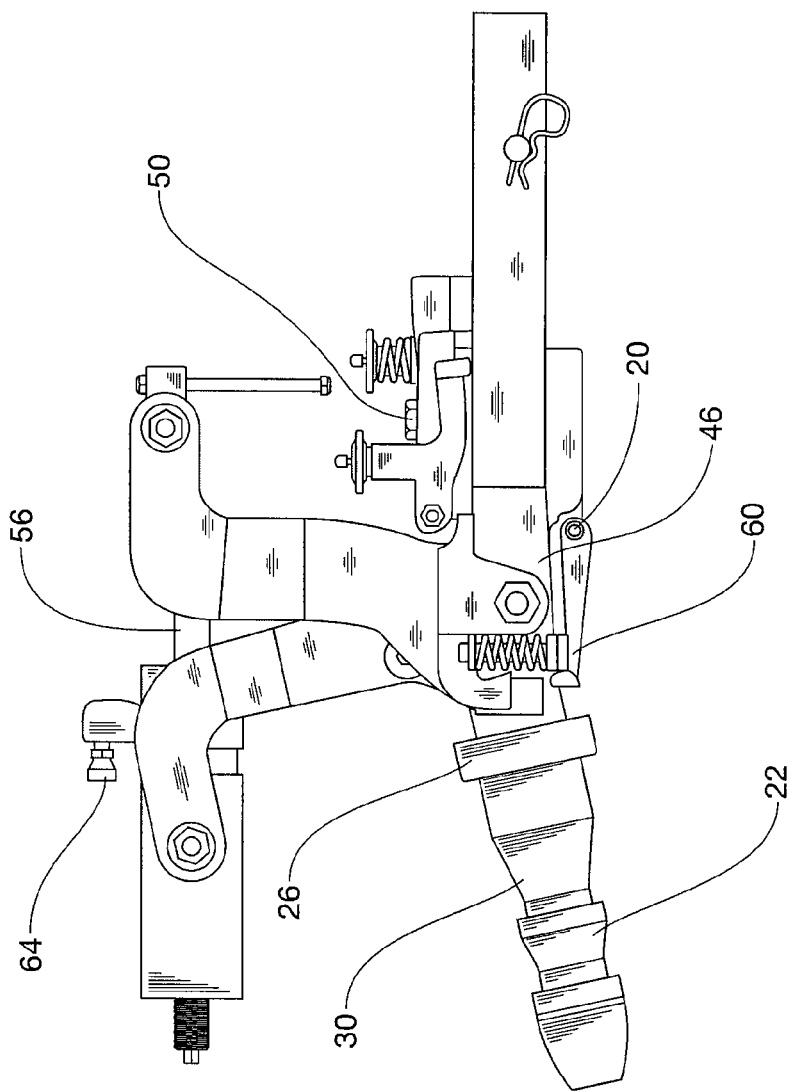
FIG. 3 is a side view illustrating a vertical articulated joint according to the invention.
Figure 3:
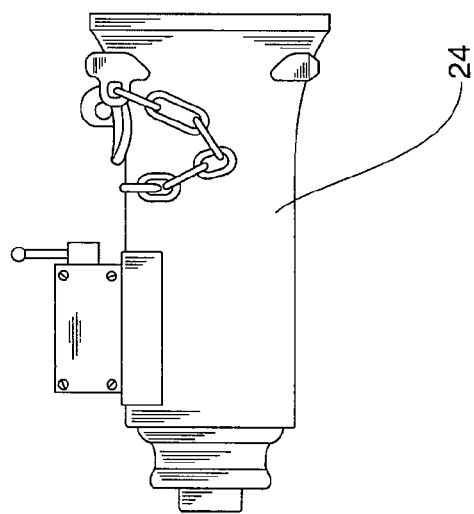

Referring now to the drawings in general and FIG. 1 in particular, it will be understood that the illustrations are for the purpose of describing a preferred embodiment of the invention and are not intended to limit the invention thereto. As best seen in FIG. 1, a transporter, generally designated 10, is shown constructed according to the present invention. The transporter includes a first unit 12; at least one second unit 14; a coupler 16 attached between said first unit and said second unit, said coupler coaxially aligned with the coupling axis thereby permitting rotational movement perpendicular to the coupling axis. Coupler 16 is made of inner cylindrical shaft 22 and a sleeve 24, as shown in FIG. 3. The coupler 16 may further include at least one articulated joint 20.

Figure 2:
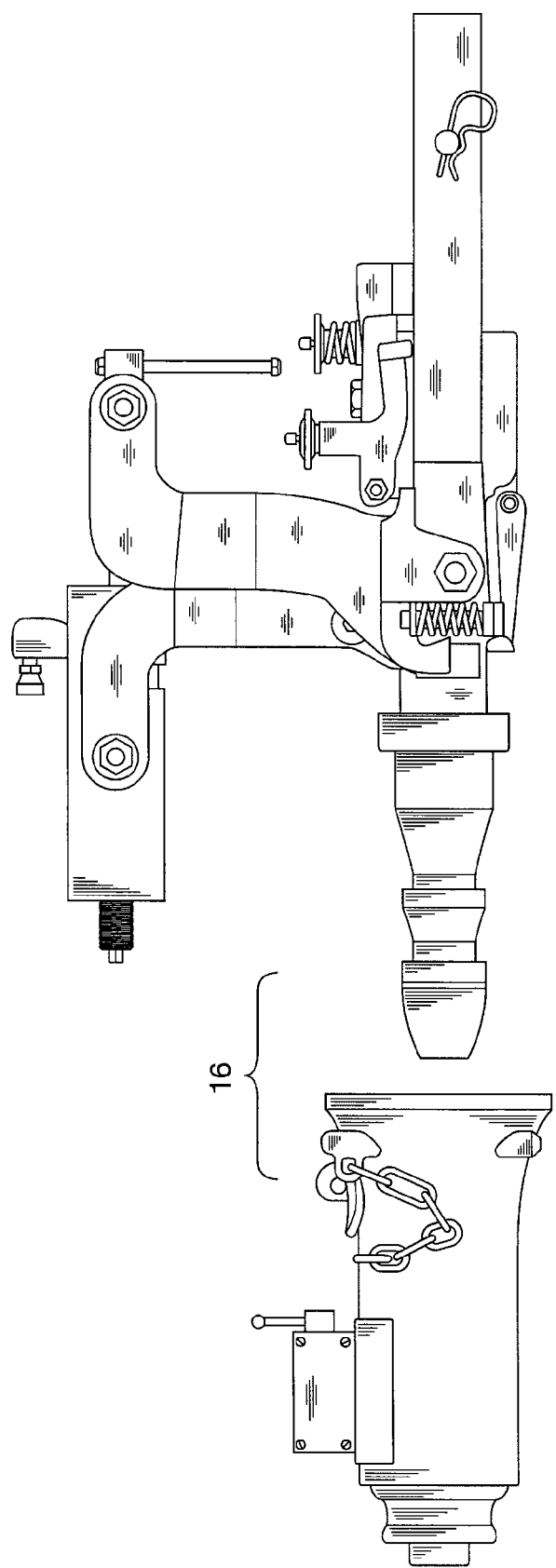
FIG. 2 is a side view of a transporter shown in FIG. 1.
Figure 6:
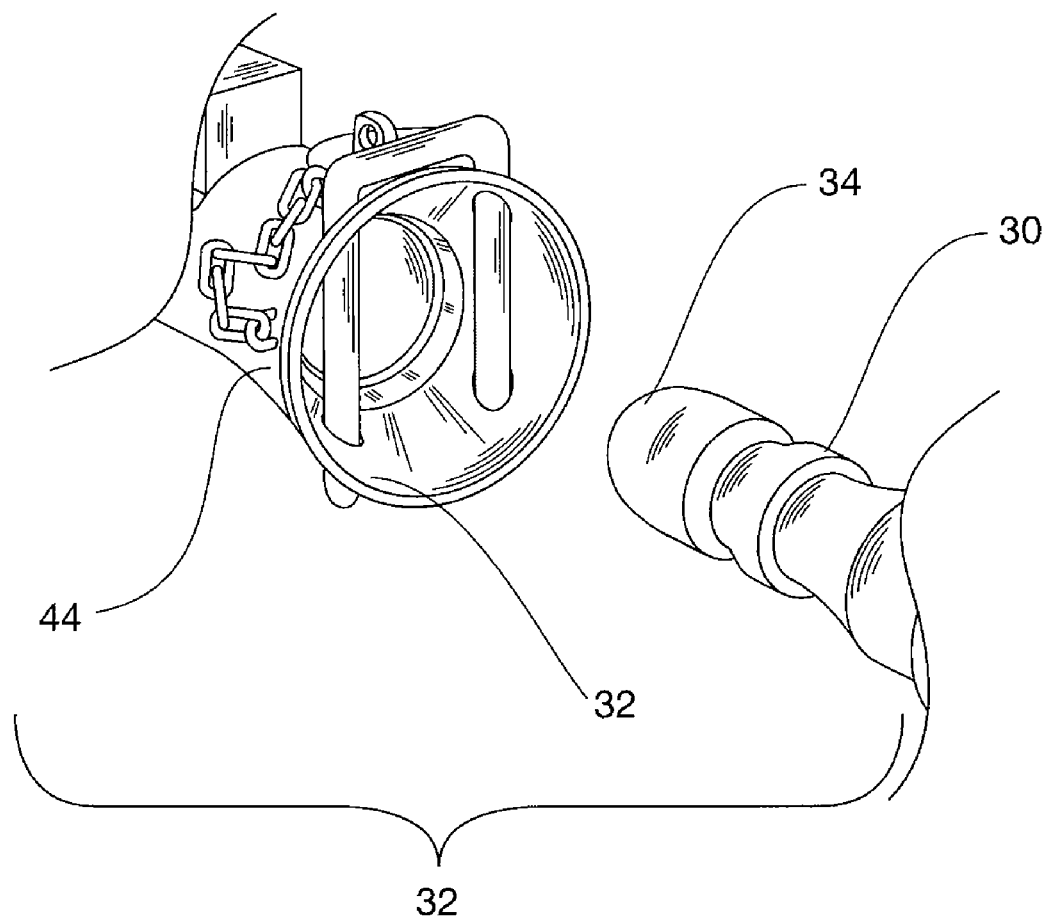
FIG. 6 is a perspective view illustrating a releasable pin according to the invention.

When coupling the inner shaft 22 into the sleeve 24 the items become coaxially aligned due to the presence of the flared end 32 on the sleeve 22 and tapered end 34 of the inner shaft 24 as shown in FIG. 6, thereby forcing the inner shaft 22 to follow the contour of the flared end 32 of the sleeve as shown in FIG. 2. Once the inner shaft 22 enters the sleeve 24, the hitching unit 10 is coupled in either of one or two ways. One method would be by the utilization of a releasable pin 44 shown in FIG. 6, which when put in place secures against at least one locking shoulder 26 of the inner shaft 22 and can be further fastened by use of a locking pin or related fastener inserted into safety lock shown on the top of the releasable pin 44.

Figure 7:
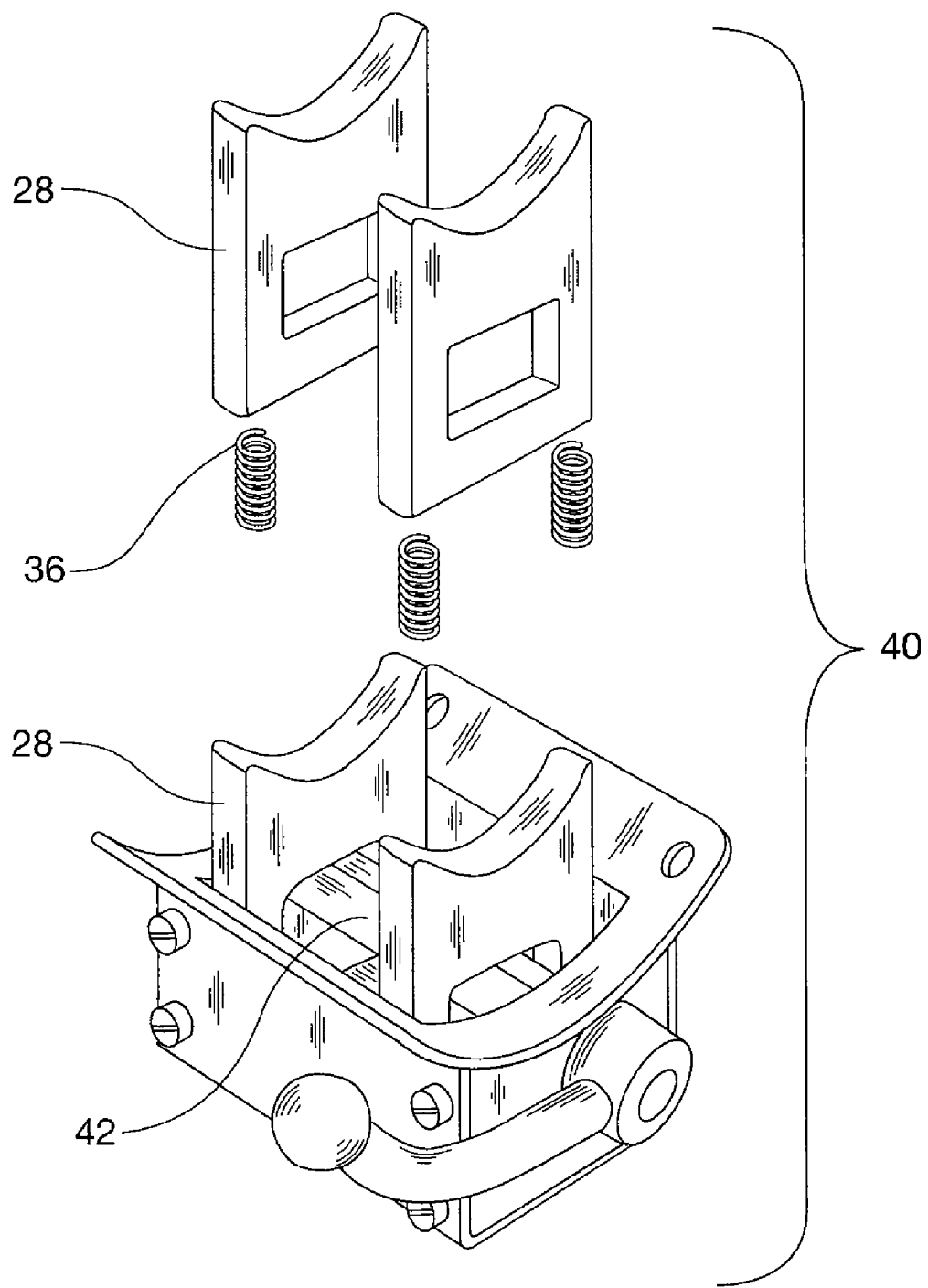
FIG. 7 is an exploded bottom plan view illustrating a cammed lever assembly according to the invention.

The other method to lock the inner shaft 22 into the sleeve 24 involves the use of mating shoulders 28, shown in FIG. 7, that are mechanically flushed through the use of a cammed system 40, which is controlled with a mechanical lever 42 whereby the mating shoulders 28 are mechanically forced to be flushed with the surface of the inner shaft 22 against the surface of the inner mating shoulders 30. The mating shoulder 28 may also use a closed biased system 36 whereby the closed bias acts to flush the mating shoulder 28 with the inner shaft 22 thereby securing the inner shaft 22 inside of sleeve 24. The closed bias can be accomplished through the use of force such as a spring system 36, gravity or the like.

Figure 4:
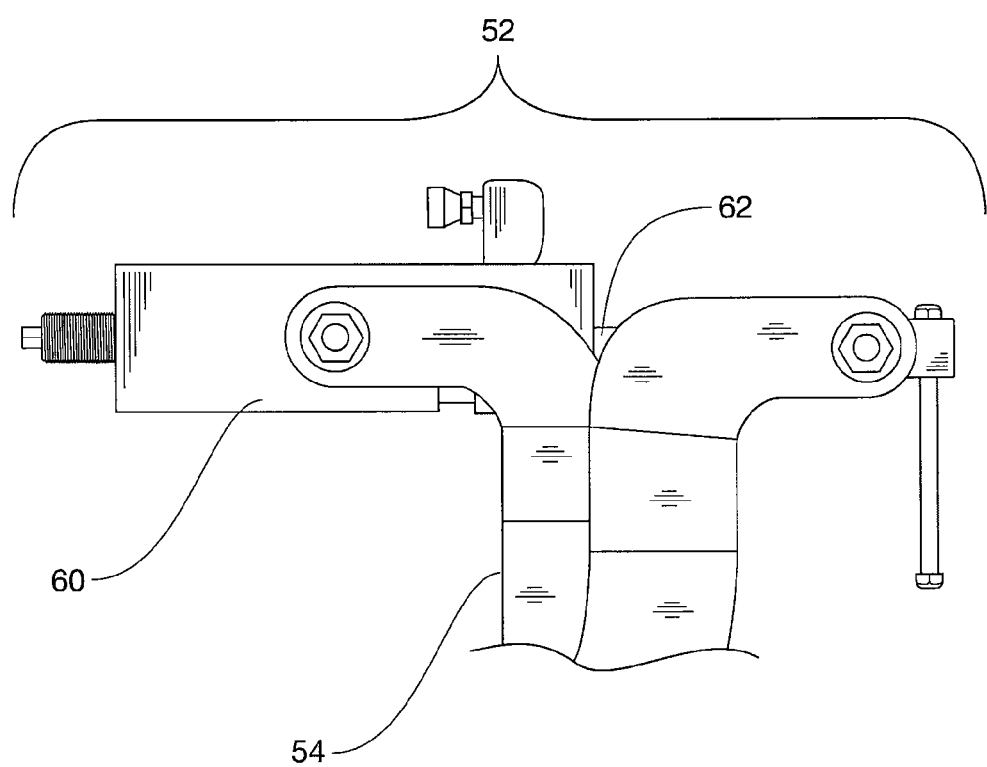
FIG. 4 is a side view illustrating a load leveling assembly according to the invention.

The invention as shown contains two articulated joints; a vertical articulated joint 46 and a horizontal articulated joint 50. The vertical articulated joint allows for restrained rotation as shown in FIG. 3 if accompanied by the fulcrum arm with spring assembly 60 or load leveling system 52 as shown in FIG. 4. In an alternative embodiment, the load leveling system 52 and fulcrum arm with spring assembly 60 may not be necessary.

As shown in FIG. 4, the preferred embodiment will contain a load leveling device 52 that rotates about the vertical articulating joint. This load leveling device should contain at least one lever 54 connected to a traveling force mechanism 56, as shown in FIG. 3, so that when either of the first unit 12 or second unit 14 changes vertical direction based upon gravitational load or vertical traveling force, the load leveling device 52 acts to stabilize those forces. The load leveler device has a fulcrum arm 60 mounted on its bottom that biases the ends of coupling unit 16 upward. The load leveling device operates through the use of some type of traveling force mechanism 56.

As also shown in FIG. 4 as one embodiment of the present inventions, the device includes a hydraulic cylinder 62 that is connected to two leveling arms and pivoted at each end as the force load deflects either first unit 12 or second unit 14 in the vertical direction. The hydraulic cylinder 62 either compresses or expands and thereby restricts the motion of the force compression of either unit. The hydraulic cylinder can also be powered by an external power source such as compressed air 64. In addition, in place of the hydraulic cylinder 62 a spring assembly could be used to accomplish similar goals. In addition to force stabilization, the load leveling device acts to return both the first unit 12 and second unit 14 to normal uncoupled operating ride heights.

The load leveling assembly works by expanding the traveling force mechanism 56, which pushes mechanical lever 54 about the vertical articulated joint, thereby raising the "tongue" of towed unit and the back of the towing unit to heights approaching normal uncoupled ride heights.

Figure 8:
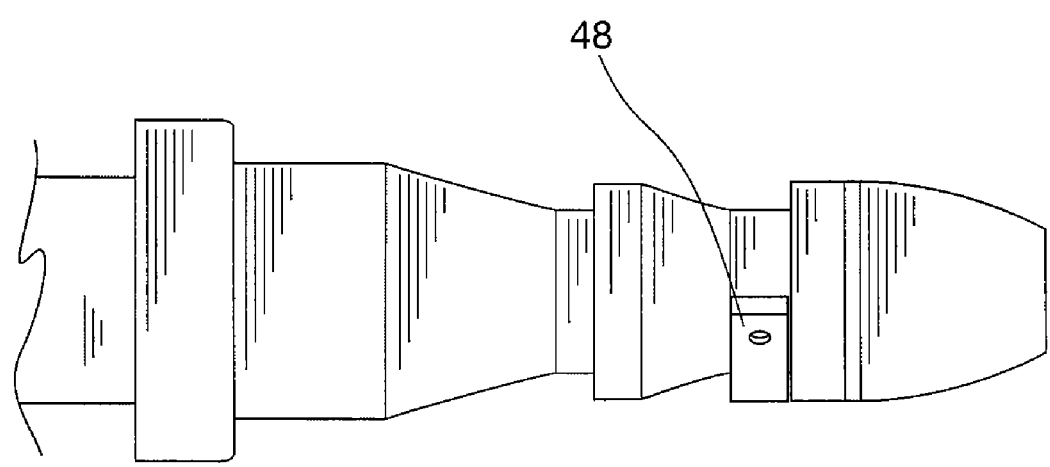
FIG. 8 is a side view of a shear collar according to the invention.

The hitch assembly offers full rotational ability among the horizontal axis restrained by a shear collar 48 fixed to the inner shaft 22 as shown in FIG. 8. The shear collar 48 operates by restraining rotational movement about the horizontal axis when the locking shoulder 28 comes in contact with the shear collar 48. In the preferred embodiment, shear collar covers approximately 250° of inner shaft. Upon appropriate rotational force, shear collar 48 "fractures" off the inner shaft 22 allowing full 360° horizontal axis rotation. The shear collar 48 can be fixed by a variety of methods including but not limited to a soft weld, studded assembly and the like.

Figure 5:
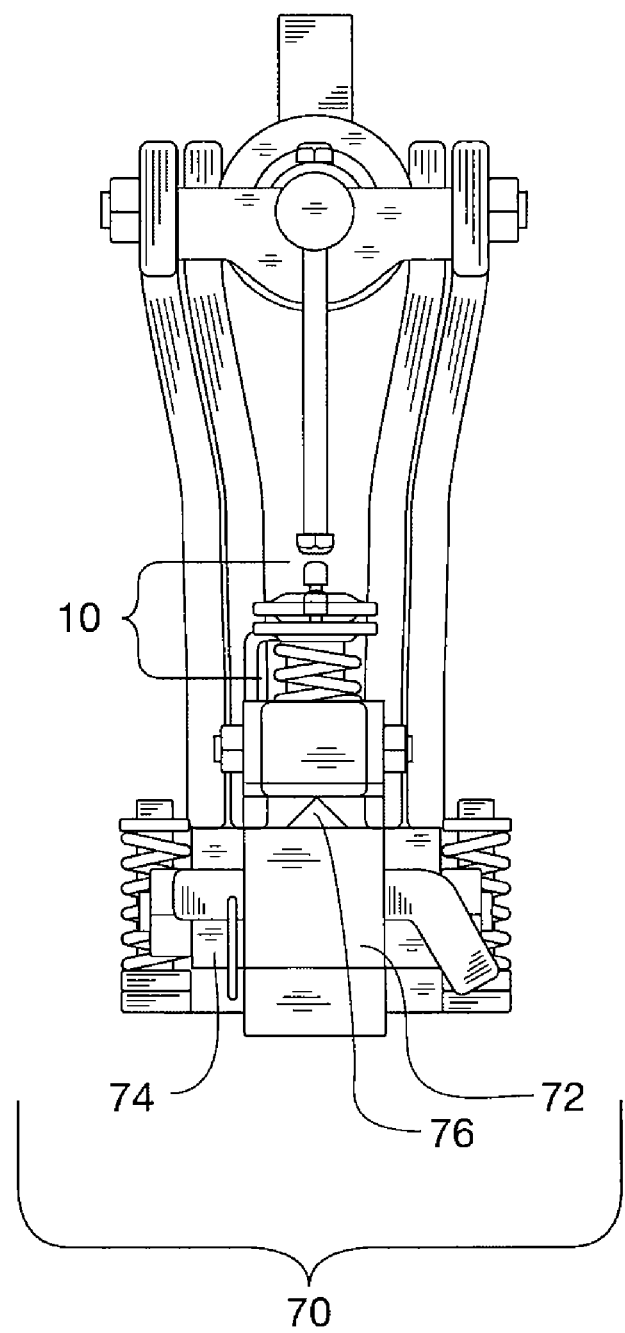
FIG. 5 is a perspective view illustrating a restricting mechanism according to the invention.

As shown in FIG. 5, the coupling unit has a restricting mechanism 70 for placing the coupling unit in a variety of operations including hitching, towing and stowed. The restricting mechanism involves an assembly of mechanically activated levers and stops. In the hitching position, a lever where distal end 72 is notched is mechanically activated to stop against a pyramid shaped mating assembly stop 76. In this manner, coupling assembly is secured in the hitching position while allowing limited travel. In the towing position, the lever with notched distal end 72 is elevated so as to not allow any contact between restricting mechanism and mating assembly stop 76, thereby allowing substantial rotational movement for towing purposes. In the stowed position, coupling unit 10 attached to said first unit is rotated at a right angle to be secured against the back of the vehicle. The second set of mechanical levers, those having distal ends that contain hooks 74, are then mechanically activated to hold coupling unit in place.

In operation, the improved coupler for connecting at least two units has improved ease of attachment while, at the same time, provides an auto lock mechanism for permitting hands free coupling of the units.

Certain modifications and improvements will occur to those skilled in the art upon a reading of the foregoing description. By way of example, it will become apparent that a lesser or greater number of biased locking shoulders may be used for specific load capabilities. Also, some operations may not require the load leveler or may use a different force mechanism to accomplish the load leveling function. Other operations may not utilize the articulated joints. Also, reasonable modifications could be made to allow the coupling device to be used in other art fields such as for coupling a fluid hose and the like. It should be understood that all such modifications and improvements have been deleted herein for the sake of conciseness and readability but are properly within the scope of the following claims.

I claim:

1. A transporter, said transporter comprising:
   (a) a first unit;
   (b) at least one second unit;
   (c) a coupler for coupling said first unit and said second unit and defining a coupling axis from said first unit to said at least one second unit through said coupler;
   (d) an articulated joint defined between the coupler and either of said first unit or said at least one second unit;
   (e) at least one lever carried by the articulated joint and having a traveling force mechanism connected therewith for providing load leveling forces to the transporter in response to movement of the lever; and
   (f) a fulcrum arm with a spring assembly in engagement with the coupler for biasing the ends of said coupler upwardly;
   (g) wherein said coupler is coaxially aligned with the coupling axis thereby permitting rotational movement of said coupler perpendicular to the coupling axis.

2. The transporter according to claim 1, wherein said articulated joint is disposed in one of a vertical or a horizontal direction.

3. The transporter according to claim 2, wherein said articulated joint includes at least one vertically disposed articulated joint and at least one horizontally disposed articulated joint.

4. The transporter according to claim 2, wherein said articulated joint is horizontally articulated and further includes a restricting mechanism.

5. The transporter according to claim 4, wherein said restricting mechanism about said horizontally articulated joint includes a first lever assembly notched on a mating surface against a mating assembly.

6. The transporter according to claim 5, wherein said first lever assembly is selectively movable between a first position flush with the mating assembly when in a locked position for coupling said first unit and said second unit and a second position away from the mating assembly when in an unlocked position for towing said first unit and said second unit.

7. The transporter according to claim 4 wherein said restricting mechanism about said horizontally articulated joint includes a second lever assembly straddling a mating surface of said mating assembly.

8. The transporter according to claim 7, wherein said second lever assembly is selectively movable from an initial position away from mating assembly allowing for full horizontal movement, to another position where coupling unit is rotated about 90° and said second lever assembly is moved to straddle coupling body when in a stowed position.

9. The transporter according to claim 1, wherein said traveling force mechanism is pivotable about said lever.

10. The transporter according to claim 1, wherein said traveling force mechanism includes a hydraulic cylinder.

11. The transporter according to claim 10, wherein said hydraulic cylinder includes an external power source.

12. The transporter according to claim 1, wherein said first unit is a tractor.

13. The transporter according to claim 12, wherein said tractor is a wheeled tractor.

14. The transporter according to claim 1, wherein said second unit is a load.

15. The transporter according to claim 14, wherein said load is a wheeled trailer.

16. The transporter according to claim 1, wherein said coupler includes an inner shaft connected to one of said units; a sleeve connected to said other unit for receiving the inner shaft; and at least one locking shoulder on said inner shaft and at least one mating shoulder in the sleeve.

17. The transporter according to claim 16, wherein the distal end of said sleeve is flared.

18. The transporter according to claim 16, wherein the proximal end of said sleeve is capped.

19. The transporter according to claim 16, wherein said locking shoulder extends outwardly and said mating shoulder extends inwardly.

20. The transporter according to claim 19, wherein said inner shaft is tapered and said mating shoulder is biased in the closed position.

21. The transporter according to claim 19, wherein at least one of said locking shoulder and said mating shoulder is releasable.

22. The transporter according to claim 21, wherein said mating shoulder extending inwardly includes a cammed release.

23. The transporter according to claim 22, wherein said caromed release is a mechanical lever.

24. The transporter according to claim 19, further including at least one shear collar flush with a mating surface of said inner shaft.

25. The transporter according to claim 24, wherein said shear collar is fixed to the inner shaft and covers about 250° of said inner shaft.

26. The transporter according to claim 24, wherein the overlap between said locking shoulder and said mating shoulder is greater than about 45°.

27. The transporter according to claim 26, wherein the overlap between said locking shoulder and said mating shoulder is substantially 360°.

28. The transporter according to claim 16, further including a second lock mechanism.

29. The transporter according to claim 28, wherein said second lock mechanism includes at least one removable pin engaging said inner shaft and said sleeve.

30. A coupler for coupling a first transporter unit to a second transporter unit, said coupler comprising:
   a sleeve carried by the first transporter unit;
   a shaft carried by the second transporter unit and being engageably inserted into the sleeve, the second transporter unit defining an articulated joint in communication with the shaft for allowing pivotable movement of the shaft relative to the second transporter unit; and
   a load leveling system comprising at least one leveling arm in engagement with a traveling force mechanism that is moveable in response to pivotal movement of the shaft relative to the second transporter unit;
   wherein the sleeve and shaft define a coupling axis extending from the first unit through a center of the sleeve and the shaft towards the second unit, and further wherein at least one of the sleeve or the shaft is rotatable about the coupling axis.

31. The coupler according to claim 30, wherein said articulated joint is disposed in at least one of a vertical or a horizontal direction.

32. The coupler according to claim 30, wherein said traveling force mechanism includes a hydraulic cylinder.

33. The coupler according to claim 32, wherein said hydraulic cylinder includes an external power source.

34. The coupler according to claim 30, further including a fulcrum arm with a spring assembly in engagement with the coupler for biasing the ends of said coupler upwardly.

35. The coupler according to claim 30, wherein said articulated joint is horizontally articulated and further includes a restricting mechanism.

36. The coupler according to claim 35, wherein said restricting mechanism about said horizontally articulated joint includes a first lever assembly notched on a mating surface against a mating assembly.

37. The coupler according to claim 36, wherein said first lever assembly is selectively movable between a first position flush with the mating assembly when in a locked position for coupling said first unit and said second unit and a second position away from the mating assembly when in an unlocked position for towing said first unit and said second unit.

38. The coupler according to claim 36, wherein said restricting mechanism about said horizontally articulated joint includes a second lever assembly straddling a mating surface of said mating assembly.

39. The coupler according to claim 38, wherein said second lever assembly is selectively movable from an initial position away from mating assembly allowing for full horizontal movement, to another position where coupling unit is rotated about 90° and said second lever assembly is moved to straddle coupling body when in a stowed position.

40. The coupler according to claim 30, wherein said first unit is a tractor.

41. The coupler according to claim 40, wherein said tractor is a wheeled tractor.

42. The coupler according to claim 30, further including at least one locking shoulder on said shaft and at least one mating shoulder defined in the sleeve.

43. The coupler according to claim 42, wherein the distal end of said sleeve is flared.

44. The coupler according to claim 43, wherein the proximal end of said sleeve is capped.

45. The coupler according to claim 43, wherein said locking shoulder extends outwardly and said mating shoulder extends inwardly.

46. The coupler according to claim 45, wherein said inner shaft is tapered and said mating shoulder is biased in the closed position.

47. The coupler according to claim 45, wherein at least one of said locking shoulder and said mating shoulder is releasable.

* * * * *